Oct. 17, 1961  T. M. EAGAN  3,005,084
FOOD WARMER

Filed Feb. 20, 1959  2 Sheets-Sheet 1

INVENTOR
THOMAS M. EAGAN

BY

ATTORNEY

Oct. 17, 1961 T. M. EAGAN 3,005,084
FOOD WARMER
Filed Feb. 20, 1959 2 Sheets-Sheet 2
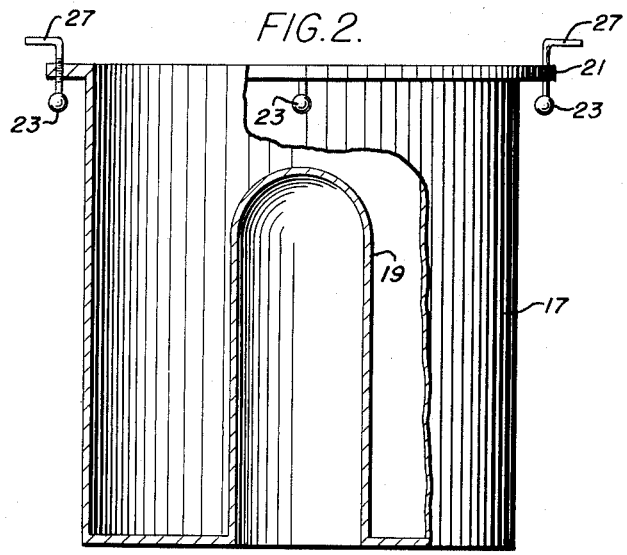
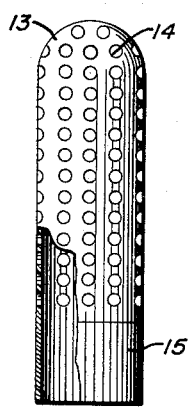
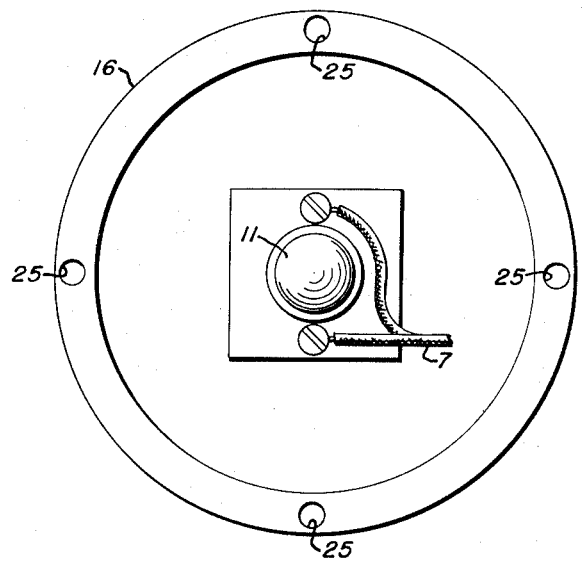
INVENTOR
THOMAS M. EAGAN
BY
ATTORNEY

3,005,084
FOOD WARMER
Thomas M. Eagan, 1464 Webb Ave., Detroit, Mich.
Filed Feb. 20, 1959, Ser. No. 794,688
4 Claims. (Cl. 219—45)

This invention relates generally to food warmers and more specifically to food warmers having a heating element centrally located therein.

Food warmers presently in commercial use heat the contents of the container by means of heating coils in the outside walls of the unit. This type of heating reduces the efficiency of operation due to a loss of heat to the surrounding atmosphere. This type of device, in order to be useful for warming more than one type of food stuff also requires some type of thermostatic control in order that it may be used to maintain the contents at various desired temperature. The usual thermostat is undesirable in that it makes the warmer more complicated due to additional parts and also makes the cleaning thereof more difficult since the thermostat cannot be immersed in water.

Accordingly, it is an object of the invention to provide a food warming device which is simple in construction and operation, economical in use, and which may be easily kept clean.

A further object of the invention is to provide a food warmer wherein the temperature may be varied without the use of a thermostat thereby making it useful for various food stuffs.

A still further object of the invention is to provide a food warmer which will readily lend itself to economical manufacture.

Other objects and advantages will become apparent to those skilled in the art upon reference to the accompanying specification, claims and drawings in which:

FIG. 2 is a sectionalized side elevation of view of the inner lining used in the food warmer;

FIG. 3 is a side elevational view of the perforated unit surrounding the heating bulb;

FIG. 5 is a plan view of the outer casing.

Like characters of reference are used to designate like parts in the specification and throughout the several views.

Figure 1:
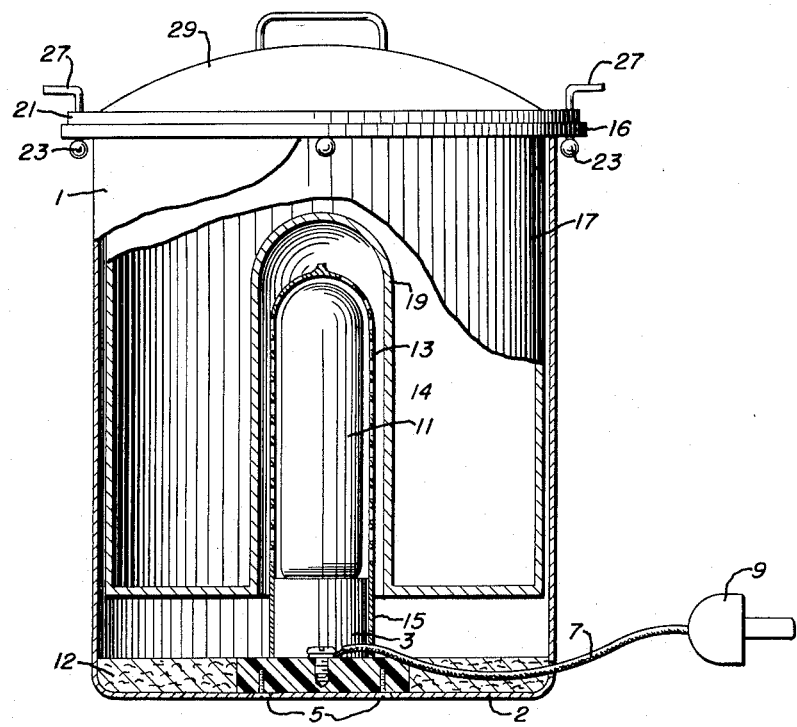
FIG. 1 is a side elevational view of the invention partially in section to show its construction.

Referring now to the accompanying drawings in detail, a food warmer is shown comprising an outer container 1 having a circular cross-sectional area with the lower end thereof being closed and the upper end open. An electrical socket 3 is mounted on the inner base portion 2 of container 1 by means of the screws 5 as shown in FIG. 1. A standard electrical connector 7 is used to supply electrical energy to the socket 3, the connector terminating in a standard type male plug 9 at the end thereof. A tubular type electric lamp 11 is mounted in socket 3, and a perforated metallic unit 13 covers the lamp 11. The lower portion 15 of unit 13 is not perforated and frictionally fits the outer wall of bulb socket 3. The upper edge of container 1 termines in a flange 16. Flange 16 has four holes 25 equally spaced around its circumference as is more clearly shown in FIG. 5.

The construction of the liner is shown in FIG. 2. The liner 17 is also circular in cross-sectional area and has an outside diameter substantially smaller than the inside diameter of container 1. This allows the liner to fit inside container 1 as shown in FIG. 1. The outer wall of liner 17 forms a cylinder which is open at its upper end. The lower portion of the liner is formed in such a manner that a cylindrical portion 19 extends centrally upward into the enclosure formed by liner 17. This cylindrical portion 19 is closed at its upper end and open at its lower end. The open upper end of liner 17 terminates in an outwardly extending flange 21. Four support members 23 subtend from the flange 21 of liner 17 and are equally spaced around the circumference thereof. Handles 27 extend upward and outward from flange 21 for lifting and carrying the liner. The inside diameter of re-entrant cylinder 19 of liner 17 is greater than the outside diameter of perforated shield 13.

Figure 4:
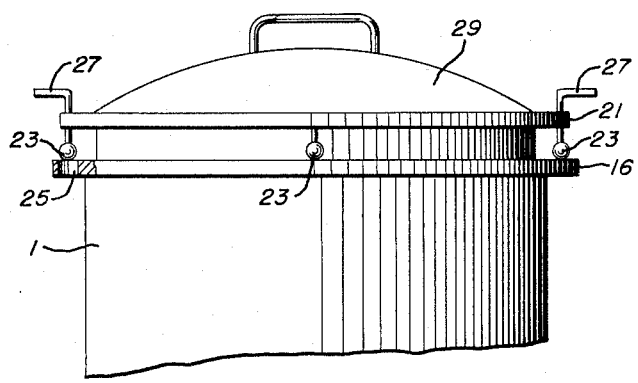
FIG. 4 is a partial view similar to FIG. 1 with the inner lining illustrated in its raised position.

As can be seen from FIGS. 1 and 4 the warmer has two operating positions. FIG. 1 shows the food warmer in its down or closed position with flange 21 of liner 17 resting upon flange 16 of container 1. This down position is attained by aligning supports 23 of liner 17 with the holes 25 in the flange of container 1. Since flange 21 is flush with flange 16 there is no air circulation between the container and the liner and substantially all of the heat from lamp 11 is dissipated into the food stuffs contained in the liner.

FIG. 4 shows the warmer in use in its up position. This position is attained by rotating the liner so that supports 23 are not in alignment with holes 25. In this position some of the heat from lamp 11 will pass below liner 11 and upward through the space between liner 11 and container 1, passing out into the atmosphere through the opening created by supporting members 23. A small additional amount of heat will likewise escape from the walls of liner 17 into the atmosphere. It can thus be seen that this invention provides a food warmer which may be operated at two different temperature levels without requiring a thermostat.

FIG. 3 shows the details of shield 13 which encloses heat source 11. This shield performs two separate functions. It is a protective device in that it prevents the possibility of damage to the tube 11 when the liner 17 is inserted into the container 1. The secondary function of shield 13 is dependent upon the size of the holes 14 of the liner. The food stuff in the container is warmed by conductive heat and by radiant heat. The radiant heat from the filament of lamp 11 will only reach the liner 17 where it passes through the holes 14. Therefore, the amount of radiant heat reaching the liner is controlled by the total area of the holes 14 in shield 13 and the shield may be designed according to the contemplated uses of the food-warmer and different shields may be used for differing requirements.

A standard type of lid 29 is shown having a diameter which is large enough to cover the upper opening of liner 17 and small enough to fit between the handles 27. The lid rests on flange 27 of liner 17.

Thus it can be seen from the foregoing that this invention provides a new, useful and versatile food warmer. It is easily cleaned since the food stuff only comes into contact with the liner, and the liner is easily removed and may be immersed in water since it has no electrical parts or connections. It is inexpensive to build since no thermostats or other complicated electrical parts are required. It requires little or no maintenance and the heating element is easily replaced.

The description and the drawings are illustrative only since many modifications will now become apparent. The device may assume various shapes other than the cylindrical shape shown in the drawings and a properly designed wire coil or Calrod unit could be used in place of the lamp.

I claim:

1. A food warmer comprising an open container having a removable inner lining, a heating element centrally mounted within said container and substantially surrounded by said inner lining and a perforated shield between said heating element and said inner lining, said container terminating in an outwardly extending flange at its open end and said liner terminating in an outwardly extending flange at its upper end, said liner flange being supported by said container flange, said container flange having a plurality of openings therein and said liner flange having a like plurality of subtending support members, said support members passing through said openings when aligned therewith and resting upon said container flange when misaligned therewith whereby a separation is created between said container and said liner when said support members are misaligned with said openings, said separation providing a means for venting a portion of the heat created by said heating element.

2. A food warmer comprising an outer casing open at one end, a removable inner lining open at one end and supported by said outer casing, said outer casing terminating in an outwardly extending flange at its open end and said inner lining terminating in an outwardly extending flange at its open end, said flanges providing the support for said liner, a heating element centrally mounted within said outer casing and substantially enclosed by said inner lining, support members subtending from said inner lining flange, a plurality of openings in said casing flange, said support members passing through said openings when aligned therewith and supporting said liner in a raised position above said casing flange when out of alignment with said openings.

3. The apparatus of claim 2 wherein said heating element comprises an electric lamp and a perforated shield surrounding said lamp.

4. A variable temperature food warmer comprising an outer cylindrical casing having a closed lower end and an open upper end terminating in an outwardly extending flange, said flange having a plurality of circumferentially spaced holes, a tubular electric lamp centrally mounted on the inner lower end of said casing and extending upwardly within said casing for providing a heat source, means for supplying electrical energy to said lamp, a perforated shield surrounding said lamp, a removable cylindrical inner liner of substantially smaller diameter than said casing, said liner having a closed lower end and an open upper end, said closed lower end having a centrally located cylindrical reentrant portion for accommodating said electric lamp and said shield, said upper end of said liner terminating in an outwardly extending flange, support members, equal in number to said holes, subtending from said liner flange, said support members having a smaller cross-sectional area than said holes, whereby the support members pass through said holes when in alignment therewith and support said liner above said casing flange when out of alignment with said holes.

References Cited in the file of this patent
UNITED STATES PATENTS

| | | |
|---|---|---|
| 358,505 | Tatum | Mar. 1, 1887 |
| 949,606 | Tetherow | Feb. 15, 1910 |
| 952,941 | Perkins | Mar. 22, 1910 |
| 1,230,342 | Thornberg | June 19, 1917 |
| 2,090,666 | Copeland | Aug. 24, 1937 |
| 2,371,410 | Rickenbacher | Mar. 13, 1945 |

FOREIGN PATENTS

| | | |
|---|---|---|
| 212,927 | Great Britain | Dec. 31, 1925 |
| 301,617 | Great Britain | Dec. 6, 1928 |